United States Patent Office 3,529,031
Patented Sept. 15, 1970

3,529,031
RECYCLE OF AZEOTROPES IN TOLUENE DISPROPORTIONATION PROCESS
Seiya Otani, Takao Iwamura, Shotaro Hayashi, and Daisuke Ogawa, Ohtsu-shi, Japan, assignors to Toyo Rayon Kabushiki Kaisha, Tokyo, Japan, a corporation of Japan
No Drawing. Filed Apr. 10, 1969, Ser. No. 815,193
Claims priority, application Japan, Apr. 15, 1968, 43/24,736
Int. Cl. C07c 3/58, 7/00; B01d 3/34
U.S. Cl. 260—672                            6 Claims

ABSTRACT OF THE DISCLOSURE

In the preparation of benzene and xylene by subjecting toluene to the disproportionation reaction at elevated temperature and pressure in hydrogen atmosphere, an improvement comprising the steps of cooling the reaction product to separate gaseous component from liquid component, feeding the liquid component to a stabilizer to rectify the same, and recycling a portion of condensed liquid of low boiling point fraction collected near the top of the stabilizer, to the disproportionation step.

---

This invention relates to the preparation of benzene and xylene by disproportionation of toluene, and particularly to the preparation of high purity benzene by disproportionation of toluene.

Conversion of toluene into benzene and xylene is generally referred to as disproportionation reaction of toluene, which is industrially valuable since whereby toluene of relatively limited utility can be used as the material of such important industrial chemicals as benzene and xylene. Furthermore, because the production of polyamide and polyester synthetic fibers has been rapidly increasing in the recent years, importance of benzene and xylene as the respective starting materials of the fibers is also increased. As an inevitable consequence, the significance of toluene disproportionation reaction is attracting steadily increasing attention.

On the other hand, qualitative requirements, particularly those on purity, are becoming increasingly rigorous on cyclohexane which is obtained by hydrogenation of benzene and is used as a starting material of polyamide fibers, and on para-xylene which is separated from xylene and is used as a starting material of polyester fibers. Consequently, particularly purity of benzene which is intimately related with cyclohexane purity is required to be still higher in the recent years.

It is well known that the disproportionation reaction of toluene progresses smoothly at high temperature and pressure in hydrogen atmosphere, catalytically at vapor phase. However, it is also known that in the conventional practice of the disproportionation process, even when the starting toluene is sufficiently purified, paraffins and cycloparaffins formed by decomposition of hydrocarbons, which takes place as a side reaction, are mixed into the reaction product to degrade quality of the latter. Among the paraffins and cycloparaffins formed by the side reaction, particularly those of 6–7 carbons are detrimental to the production of high purity benzene even when they are present in such trace amounts in the order of p.p.m., because the greatest parts thereof are transferred into benzene in conventional distillation and are difficult to be removed by subsequent purification. Therefore, it has been an urgent need of the concerned industries to reduce the mixing-in of paraffins and cycloparaffins of 6–7 carbons to the minimum. Conventional disproportionation processes of toluene, however, have been still unsatisfactory in this point.

We engaged in an extensive research in the purpose of obtaining high quality benzene by disproportionation reaction of toluene, and as the result discovered that, when the paraffins and cycloparaffins formed of the disproportionation reaction are recycled into the disproportionation reaction system, the paraffins or cycloparaffins are readily decomposed under the reaction conditions and converted to hydrocarbons containing less carbon atoms. Whereupon the present invention is completed.

According to the invention, a disproportionation process of toluene in which toluene is subjected to a disproportionation reaction under an elevated temperature and pressure, in hydrogen atmosphere to produce benzene and xylene is provided, the process being characterized by the steps of cooling the reaction product to separate its gaseous component from the liquid component, feeding the liquid component to a stabilizer, and recycling at least a part of the condensed liquid containing the lower boiling point fraction collected in the upper portion of the stabilizer to the disproportionation reaction system.

The disproportionation reaction of toluene per se performed in the subject process is subject to no specific limitations, but can be conducted in accordance with known, conventional practice. That is, the reaction generally refers to disproportionation of toluene at high temperatures and pressures in hydrogen atmosphere, in the presence of a solid acid catalyst, to produce benzene and xylene. The reaction temperature normally ranges from 300–700° C., preferably 350–550° C., and the reaction pressure, atmospheric to 100 kg./cm.$^2$, preferably 10–40 kg./cm.$^2$. The weight hourly space velocity (hereinafter abbreviated as WHSV) is 0.1–10 hr.$^{-1}$, preferably 0.3–3 hr.$^{-1}$, and the mol ratio of hydrogen gas/toluene supply ranges 1–50, preferably 5–25.

Also the type of solid acid catalyst used in the reaction neither is critical, but any of the catalysts conventionally employed is disproportionation reaction of toluene, such as crystalline alumino-silicate, silica-alumina, boria-alumina, alumina-aluminium fluoride, etc., can be used.

The reaction product obtained of the above disproportionation process contains, besides benzene, xylene and unreacted toluene, a large number of side products, e.g., paraffins such as methane, ethane, propane, butane, pentane, hexane and heptane; cycloparaffins such as cyclopentane, methylcyclopentane, methylcyclohexane, etc.; alkylbenzenes of 9 carbons such as trimethylbenzene isomers, methylethylbenzene isomers, propylbenzene isomers, etc.; alkylbenzenes of at least 10 carbons; and aromatic polycyclic compounds such as naphthalene, anthracene and derivatives thereof, biphenyl and derivatives thereof, triphenyl derivatives, etc. Among those side products, paraffins and cycloparaffins of no more than 5 carbon atoms, those of no less than 8 carbon atoms, alkylbenzenes and aromatic polycyclic compounds can be removed from benzene by distillation with relative ease, but as described later, removal of paraffins and cycloparaffins of 6–7 carbons from benzene by conventional distillation is very difficult.

According to the subject process, the product of the above-described disproportionation reaction is cooled, so as to be separated into gaseous and liquid components. The gas-liquid separation is normally effected at temperatures not higher than 100° C., preferably not higher than 50° C., in order to keep the loss of useful components such as benzene, toluene, and xylene to the minimum. During this gas-liquid separating procedure, the low boiling point components which are normally gaseous, such as hydrogen, methane, ethane, propane, butane, etc., are substantially completely eliminated from the reaction product.

Subsequently the liquid component is fed to a stabilizer to be distilled, in the purpose of eliminating the low boiling point side products dissolved in the component. Even with this distillation process, still it is very difficult to sufficiently remove the parafins and cycloparaffins of 6–7 carbons. When the reflux ratio and/or number of trays are extremely increased in the stabilizer, the removal of paraffins and cycloparaffins of 6–7 carbons to some extent, but some components can be hardly removed. In addition, the above methods is economically seriously disadvantageous. Thus, application of such a method is clearly limited in consideration of cost. Consequently it is in practice impossible to sufficiently remove the paraffins and cycloparaffins of 6–7 carbons by conventional distillation alone.

The critical feature of the present process resides in the distillation of the liquid component separated from the gaseous component as aforesaid in the stabilizer, while side-cutting at least a portion of the low boiling point condensed liquid collected near the top of the stabilizer column and recycling the same into the disproportionation reaction system, whereby decomposing the paraffins and cycloparaffins of 6–7 carbons contained in the recycled condensed liquid in the disproportionation reaction system and converting them to hydrocarbons of less carbon atoms which can be easily removed by distillation.

In the subject process, the lower boiling point condensed liquid to be recycled into the disproportionation reaction system is suitably such that which is composed mainly of benzene and also contains, as other hydrocarbons, paraffins and cycloparaffins of 6–7 carbons in minor amounts but at relatively higher concentrations. More specifically, the liquid on the tray or trays close to the top of the stabilizer column, or the reflux can be conveniently used. The optimum condensed liquid to be recycled is that on a tray or trays located in an upper portion of the stabilizer, which consists mostly of benzene and contains paraffins and cycloparaffins of 6–7 carbons as minor components but at the highest concentrations compared with those in the condensed liquids on all other trays in the stabilizer. The condensed liquid containing paraffins and cycloparaffins of 6–7 carbons at the highest concentrations is normally collected from the trays 0–10 steps below the top of the stabilizer. Such condensed liquid conssits substantially of benzene, and furthermore contains trace amounts of paraffins and cycloparaffins of 6–7 carbons and other hydrocarbons of 1 and 7 carbons.

According to the process of this invention, the paraffins and cycloparaffins of 6–7 carbons of which elimination has been heretofore difficult are converted to the hydrocarbons easily eliminatable by ordinary distillation and thereafter removed. Thus it is made possible to obtain high quality benzene never expected of conventional disproportionation process.

In the process of this invention, if an excessive amount of condensed liquid is recycled into the disproportionation system, the disproportionation efficiency is decreased since the main component of the condensed liquid is benzene. Also if an excessive amount of the liquid is withdrawn from the stabilizer, the distillation efficiency of the stabilizer is reduced. In either case it is economically disadvantageous. Thus it is normally recommendable to keep the amount of recycling liquid withdrawn from the stabilizer at a point close to the column top to no more than 50% by weight of the total liquid supply to the stabilizer, and preferably to no more than 20% by weight. While there is no critical lower limit to the amount of recycling liquid, it is normally no less than 0.1% by weight, preferably no less than 0.5% by weight, to the total liquid supply to the stabilizer, in consideration of desirable benzene quality and operation efficiency.

The operational conditions of the distillation in the stabilizer are variable according to the composition of the liquid supplied to the stabilizer, construction of the stabilizer, etc., and defy general definition. In typical cases, however, the distillation is performed at 100–500° C., preferably 200–400° C. The object products, benzene and xylene, and the starting toluene are mostly withdrawn as the liquid collected at the bottom of the stabilizer. Upon further distillation of the bottom liquid in conventional manner, each component can be separately obtained.

Incidentally, the paraffins and cycloparaffins to be removed by the subject process are not necessarily limited to those formed as the side products during the disproportionation reaction and contained in the recycling liquid taken from the stabilizer, but can be those which are initially contained in the starting toleune as the impurities.

According to the above-described process of this invention, the paraffins and cycloparaffins of 6–7 carbons can be decomposed in the disproportionation reaction system, and therefore the design of the stabilizer can be greatly simplified. Also there is an additional advantage in the present process, in that the influence of the variation in the composition of reaction liquid during the initial stage as well as appreciable variations in external conditions during the operations, on the subject process can be reduced to the minimum, by increasing the amount of the condensed liquid recycled from the stabilizer to the disproportionation reaction system. Furthermore, hydrocarbon impurities of large carbon numbers which may be contained in the starting hydrogen gas or toluene need not be rigorously eliminated, but such impurities-containing starting materials can be directly fed to the disproportionation reaction system.

Again it is possible in accordance with the subject process to obtain consistently high quality benzene, by suitably adjusting the amount of condensed liquid recycled from the stabilizer to the reaction system.

Hereinafter the invention will be explained with reference to the following examples.

EXAMPLE 1

Into a fixed bed reactor of 3.5 cm. in inner diameter which was packed with 200 g. of a catalyst composed of mordenite treated with hydrochloric acid and aluminum fluoride, 90 g. of toluene per hour was continuously supplied, and simultaneously 330 normal liters (Nl.) per hour of hydrogen gas containing 27% of low boiling point hydrocarbons was supplied. The disproportionation reaction of toluene was thus continued while the internal pressure of the reactor was maintained at 30 kg./cm.$^2$ g., and the temperature, at 440° C.

The liquid reaction product was subjected to a gas-liquid separator, and the resulting gaseous component containing 72% of hydrogen and 28% of hydrocarbons was recycled into the disproportionation reaction system. Together with the recycled gas, 7 Nl. per hour of fresh hydrogen gas containing 25% of methane and other low boiling point hydrocarbons was supplied from the outside of the system. Also the liquid component separated at the aforesaid separator was continuously supplied to a stabilizer which was operated at 195° C. and 10 kg./cm.$^2$ g.

To the starting toluene, as the typical low boiling point components, methylpentane (MP), n-hexane (n-C$_6$), methylcyclopentane (MCP), and n-heptane (n-C$_7$) were added on purpose, at the respective concentrations in toluene of 17 p.p.m., 9 p.p.m., 50 p.p.m. and 12 p.p.m. After five days' continuous operation, the reaction product obtained from the bottom of the stabilizer contained 8 p.p.m. of MP, 4 p.p.m. of n-C$_6$, 23 p.p.m. of MCP, and 2 p.p.m. of nC$_7$. Also the benzene obtained by fractional distillation of the bottom liquid contained the MP, n-C$_6$, MPC, and n-C$_7$ at the concentrations of, respectively, 29 p.p.m., 18 p.p.m., 96 p.p.m. and 7 p.p.m.

Then the condensed liquid on the third tray from the top of the stabilizer was withdrawn and recycled into the starting toluene in the continuous operation To the starting material supply of 86 g. per hour, 43 g. of the condensed liquid was extracted from the stabilizer per hour. The condensed liquid withdrawn as the side-cut was composed mainly of benzene, and contained 7 p.p.m. of MP.

3 p.p.m. of n-$C_6$, 19 p.p.m. of MCP, 2 p.p.m. of n-$C_7$, and traces of other hydrocarbons of 1-7 carbons.

After 5 days continuous operation, the benezene obtained by fractional distillation of bottom liquid contained 32 p.p.m. of MCP, 4 p.p.m. of n-$C_6$, and traces of MP and n-$C_7$. When the amount of recycling liquid was reduced to 9 g. per hour, the benzene contained MP, n-$C_6$, MCP, and n-$C_7$ at the concentrations of, respectively, 5 p.p.m., 7 p.p.m., 51 p.p.m. and 5 p.p.m. The condensed liquid recycled in this case was composed mainly of benzene, and contained 45 p.p.m. of MP, 21 p.p.m. of n-$C_6$ 83 p.p.m. of CMP, 11 p.p.m. of n-$C_7$, and minor amounts of other hydrocarbons of 1-7 carbons. When the amount of recycling liquid was further reduced to 2 g. per hour, the amounts of impurities in the benzene were increased to, respectively, 10 p.p.m., 8 p.p.m., 53 p.p.m. and 5 p.p.m. The condensed liquid recycled in this case was composed mainly of benzene, and contained 47 p.p.m. of MP, 46 p.p.m. of n-$C_6$, 120 p.p.m. of MCP, 13 p.p.m. of n-$C_7$, and minor amounts of other hydrocarbons of 1-7 carbons. Thus, the effect of recycling of the condensed liquid in the zone close to the top of stabilizer column to reduce the paraffins and cycloparaffins contents of the benzene obtained from the bottom liquid is conspicuous.

EXAMPLE 2

Disproportionation reaction of toluene was performed continuously using the same apparatus and catalyst as employed in Example 1 under identical conditions, except that the toluene to be supplied to the reaction system was thoroughly refined so that only traces of such impurities as MP, n-$C_6$, MCP, and n-$C_7$ were present therein.

When extraction and recycling of the condensed liquid collected in the vicinity of the stabilizer top was omitted, the reaction product obtained as the bottom liquid contained MP, n-$C_6$, MCP, and n-$C_7$ at the concentrations of, respectively, 8 p.p.m., 3 p.p.m., 20 p.p.m. and 1 p.p.m.

The benzene obtained by fractional distillation of this bottom liquid contained MP, n-$C_6$, MCP, and n-$C_7$ at the respective concentrations of 31 p.p.m., 16 p.p.m., 90 p.p.m. and 4 p.p.m.

When 5% by weight of the reflux of stabilizer to the liquid feed to the stabilizer was withdrawn from the system and recycled into the starting toluene in the similar continuous reaction, the benzene obtained by fractional distillation of the bottom liquid contained MP, n-$C_6$, and MCP at the respective concentrations of 14, 6, and 25 p.p.m., and also trace of n-$C_7$. The so recycled reflux contained MP, n-$C_6$, MCP, and n-$C_7$ at the respective concentrations of 51, 21, 83, and 11 p.p.m.

Comparing the results of this example with those of Example 1, it can be understood that the slight variation in the contents of paraffins and cycloparaffins of 6-7 carbons in starting toluene hardly affects the corresponding paraffins and cycloparaffins contents of the reaction product obtained from the bottom of the stabilizer column. This is a clear indication that the paraffins and cycloparaffins are decomposed in the disproportionation reaction system.

In the conventional practices, paraffins and cycloparaffins of 6-7 carbons are inevitably mixed into the benzene obtained by fractional distillation of the bottom liquid, even when the starting toluene is purified to contain only traces of such impurities. Whereas, the foregoing examples persuasively demonstrate that such impurities in benzene can be remarkably reduced in accordance with the subject process.

The results of those examples furthermore show that, in practicing the subject process, the impurities in the product benzene can be effectively reduced, without rigorous purification of starting toluene.

What is claimed is:

1. A disproportionation process of toluene in which toluene is subjected to disproportionation reaction at elevated temperature and pressure in hydrogen atmosphere to produce benzene and xylene, the process being characterized by the steps of cooling the reaction product to separate its gaseous compent from the liquid component, feeding the liquid component to a stabilizer, while recycling at least a portion of the condensed liquid containing the lower boiling point fraction collected in the upper portion of the stabilizer into the disproportionation reaction system.

2. The process of claim 1, in which the condensed liquid to be recycled contains benzene as the major component, and furthermore contains, as other hydrocarbon components, paraffins and cycloparaffins of 6-7 carbons in minor amounts but at higher concentrations.

3. The process of claim 1 in which the condensed liquid to be recycled is that collected on a tray or trays in the upper portion of the stabilizer, which contains benzene as the major component, and also paraffins and cycloparaffins of 6-7 carbons in minor amounts but at the highest concentrations compared with those in the condensed liquids on all other trays in the stabilizer.

4. The process of claim 1, in which the amount of recycled condensed liquid ranges 0.1-50% by weight to the total liquid supply to the stabilizer.

5. The process of claim 1, in which the separation of gaseous component from the liquid component of reaction product is performed at temperatures not higher than 100° C.

6. The process of claim 1, in which the disproportionation of toluene is performed in the presence of a solid acid catalyst, at temperatures ranging from 300° to 700° C., pressures ranging from atmospheric to 100 kg./cm.$^2$, at the molar ratio of hydrogen gas to toluene supply of 1-50, and weight hourly space velocity of 0.1-10 hr.$^{-1}$.

References Cited

UNITED STATES PATENTS

| | | | |
|---|---|---|---|
| 2,581,344 | 1/1952 | Anderson | 203—52 |
| 2,876,268 | 3/1959 | Ciapetta et al. | 260—674 |
| 3,193,592 | 7/1965 | Eubank | 260—672 |
| 3,287,431 | 11/1966 | Feigelman | 260—672 |
| 3,291,489 | 12/1966 | King et al. | 260—672 |
| 3,310,593 | 3/1967 | Nelson et al. | 260—672 |
| 3,400,168 | 9/1968 | Fukuda et al. | 260—672 |
| 3,442,966 | 5/1969 | Pollitzer et al. | 260—672 |
| 3,445,379 | 5/1969 | Hansen | 208—107 |

DELBERT E. GANTZ, Primary Examiner

G. E. SCHMITKONS, Assistant Examiner

U.S. Cl. X.R.

260—668, 669, 671, 674; 203—52